United States Patent [19]
Moyer

[11] 3,851,189
[45] Nov. 26, 1974

[54] BISTABLE DIGITAL CIRCUITRY

[75] Inventor: Norman E. Moyer, Newport Beach, Calif.

[73] Assignee: Hughes Aircraft Company, Culver City, Calif.

[22] Filed: June 25, 1973

[21] Appl. No.: 373,210

[52] U.S. Cl. .......... 307/279, 307/235 R, 307/238, 307/313, 328/117
[51] Int. Cl. .......... H03k 3/286
[58] Field of Search .......... 307/235 R, 205, 279, 313, 307/304, 238; 328/115.7, 206

[56] References Cited

UNITED STATES PATENTS

| | | | |
|---|---|---|---|
| 3,519,849 | 7/1970 | Tyler | 307/235 |
| 3,631,528 | 12/1971 | Green | 307/313 X |
| 3,683,284 | 8/1972 | Mueller | 328/117 |

*Primary Examiner*—John Zazworsky
*Attorney, Agent, or Firm*—W. H. MacAllister; F. I. Konzem

[57] ABSTRACT

Bistable digital circuits including cross coupled gates having complementary inputs provided by CMOS threshold circuits coupled to a common digital signal input. Complementary unbalanced transfer characteristics of the threshold circuits provide widely separated high and threshold voltages approaching respective high and low supply potentials. The coupling between gates maintains the bistable digital circuits in a given stable state until the high and low threshold voltages are crossed over in response to a change in logical level at the signal input.

6 Claims, 7 Drawing Figures

BISTABLE DIGITAL CIRCUITRY

BACKGROUND OF THE INVENTION

The advantages of metal oxide semiconductor field effect transistor (MOSFET) for large scale integration (LSI) over bipolar semiconductor transistors result from the simplicity in processing and smaller size. In addition to the resulting economy, MOSFET circuits provide a substantial reduction in power dissipation as compared to other circuitry including bipolar integrated circuits.

These advantages are important to products such as portable controls, instruments, small calculators and particularly to electronic watches and electronic medical devices where product feasibility is dependent upon the extremely low energy consumption provided by a miniature battery in the watchcase or other device enclosure. The extremely low power requirement of CMOS circuits is particularly advantageous for use with battery operated devices such as electronic watches. Even a small amount of DC power dissipation of single channel MOS circuits is reduced substantially by combining P-channel (PMOS) and N-channel (NMOS) on the same integrated circuit chip in a complementary symmetry configuration (CMOS).

In prior CMOS circuit arrangements, CMOS inverters of a balanced type are used in series to provide squaring of the input signals, but noise immunity was performed prior to introduction of the signals to the circuits of the integrated circuit chip. Since each stage of balanced inverters connected in series is limited because of its balanced operation, the individual stage could provide signal squaring, but little elimination of noise, if it occurs at the input transition voltage.

In general, various nomenclature has been used for solid-state MOS devices which are made operational by utilization of field effect phenomena, e.g., MOSFET and also IGFET (insulated gate field effect transistors). Also, a silicon-gate MOS using polycrystalline silicon instead of the metal layer as the gate electrode is another version of the MOS including PMOS and NMOS and complementary CMOS devices.

In the field-effect device of interest herein, laterally spaced source and drain electrodes are connected to respective source and drain diffusions in a semiconductor substrate. A channel region between the source and drain regions is covered with a thin layer of insulating semiconductor oxide and a gate or control electrode is disposed on top of the insulating layer. Each device, therefore, includes first and second electrodes separated by a channel defining a conductive path between the source and drain electrodes. The conductance of the channel is controlled by the electric field-produced in proportion to the signal level applied to the control electrode. The structure and process for these devices are more fully described in U.S. Pat. No. 3,700,976 having a common assignee. In addition, technical literature is now available describing MOS devices and processes for fabrication including the various types of PMOS, NMOS and CMOS devices having N or P type semiconductor substrates.

SUMMARY OF THE INVENTION

Complementary inverter (CMOS) circuits are disposed in parallel to provide separated high and low level threshold voltages to an input signal. The outputs of these threshold detectors are applied, after appropriate inversion for complementary inputs to provide a bistable circuit arrangement. Traversal of one threshold level after a previous traversal of the other threshold level produces a change in logic level of the outputs. High noise immunity is provided by the relatively wide separation of threshold levels of the respective inverter circuits, i.e., the input signal is required to traverse most of the range between the supply voltages to cross a threshold level and thereby cause the bistable output to change state.

Considering each of the inverter circuits individually, a lower threshold level circuit comprises a pair of MOS transistors of the enhancement type and opposite conductivity (N and P). The NMOS transistor of this pair is constructed to have a relatively low impedance, and the PMOS transistor has a relatively high impedance and the ratio of high and low impedances determine the unbalance in the transfer characteristic of the CMOS inverter and hence the desired threshold level. The source to drain conductive paths of the NMOS/PMOS transistor pair are connected in series and the serial pair is connected across a source of energizing potential. The unbalance in the transfer characteristic is produced by the impedance ratio ($Rn/Rp$) $\alpha$ of the MOS transistors of the inverters, wherein:

$Rn = Wn/Ln$ $Rp = Wp/Lp$ $\alpha = \sigma n/\sigma p$ and $Wn$ and $Ln$ are the width and length respectively of the channel of the N-channel transistor; $Wp$ and $Lp$ are width and length respectively of the channel of the P-channel transistor; $\sigma n$ and $\sigma p$ are N and P-channel mobilities and typically the N-channel has twice the mobility of the P-channel.

The other complementary inverter circuit of the pair has a high threshold near the positive potential of the source. This inverter circuit includes a low impedance P-channel MOSFET and a high impedance N-channel MOSFET in series between the high and low potentials of the power supply.

In combination, the gate electrodes of transistors of the complementary inverter circuits are coupled in parallel to receive the input signal in order to be responsive to input signal voltages traversing corresponding threshold levels to provide respective outputs. An inverter CMOS stage in the output circuit of one of the complementary inverters provides for inversion of the respective one of the outputs for complementary input signals to respective ones of cross-coupled NOR gates of the bistable circuits in the output.

The complete circuit provides for shaping of binary input transitions and eliminates ripple. When the threshold voltage of both circuits are not sequentially crossed, the circuit output does not change. Only if the input traverses the separation between high and low levels of the energizing potential is there any indication of change of the bistable outputs since the circuit threshold voltages of the complementary N and P-channel circuits are separated to the extent of approaching the low and high level potentials respectively of the source.

Accordingly an object of the present invention is to provide bistable circuits for digital circuit noise immunity.

Another object is the provision of complementary circuits of the field effect type having individual unbalanced characteristics for separated threshold level response to discriminate input digital signal levels.

Still another object of the present invention is to provide hysteresis in bistable electrical circuits.

A further object is the provision of complementary threshold circuits using field effect transistors to provide complementary inputs in a bistable circuit.

Another object is to provide integrated complementary inverter circuits in which the ratio of impedances of individual MOSFETS provides an unbalanced transfer characteristic for determination of the individual inverter threshold voltage transition for inputs for triggering a bistable circuitry.

A further object of the invention is to provide a plurality of threshold circuits of complementary unbalanced transfer characteristics for inputs to logic gates coupled for bistable operation.

Another object is a provision of field effect transistor circuits of complementary symmetry that are geometrically specified to produce predetermined unbalanced transfer characteristics for respective high and low threshold voltages near logic levels for triggering a flip-flop.

Other objects and features of the invention will become apparent to those skilled in the art and disclosure is made in the following detailed description of preferred embodiments of the invention.

DESCRIPTION OF THE PREFERRED EMBODIMENTS

Figure 1:
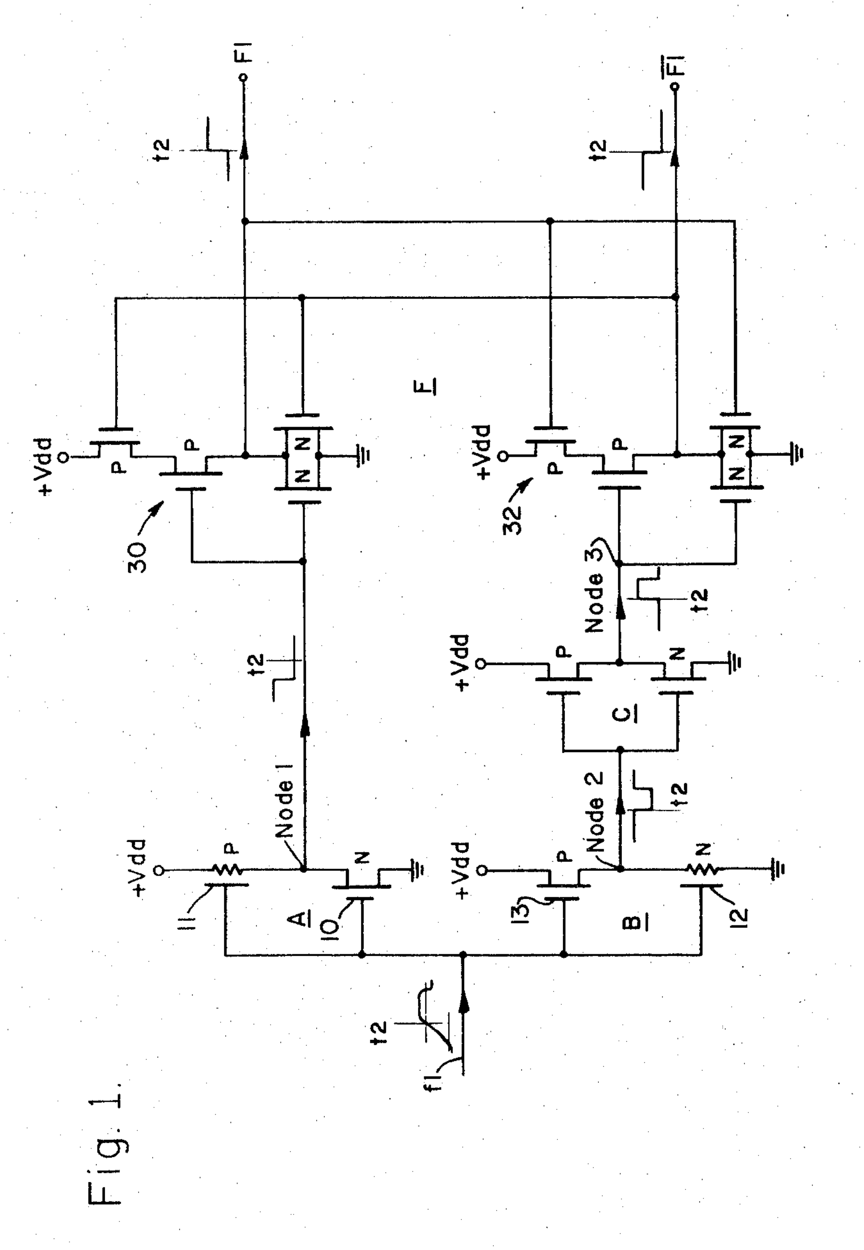
FIG. 1 is a schematic circuit diagram showing complementary threshold circuits in a bistable circuit arrangement of this preferred embodiment of the invention.

Referring now to the drawings, wherein like reference characters designate like or corresponding parts through the several views, the bistable circuit arrangement of the present invention is shown shown schematically in FIG. 1. The complementary threshold circuits A and B of unbalanced transfer characteristics are shown coupled in parallel to a single signal input *f1* to provide dual signal outputs at nodes 1 and 2. The output of circuit B at node 2 is applied to the input of balanced inverter circuit C for an inverted output at node 3. The outputs of circuits A and C are then available at the inputs to cross-coupled NOR gates 30 and 32 to provide true and false bistable circuit outputs F1 and $\overline{F1}$. As described earlier in the discussion of FIG. 1, inverter circuit A consists of one low impedance N-channel, and one high impedance P-channel enhancement-type MOS transistor. The substrate of the P-channel device is connected to high potential (+V*dd*) of the supply source and the substrate of the N-channel device 10 is connected to ground. Accordingly, when the low level, digital signal voltage applied to the input *f1* and to the gates of inverter circuit A is zero (binary 0), the signal input is negative relative to the substrate of the P-channel device and zero volts relative to the substrate of the N-channel device wherein the P-channel device 11 is conducting (ON) and the N-channel device 10 is nonconducting (OFF). Further, while the input signal is at zero volts, the P-channel device provides a conducting, high impedance path from node 1 to the supply voltage +V*dd* and a nonconducting or very high impedance path from node 1 to ground. Thus, the voltage at node 1 is at or very close to the supply voltage +V*dd* under loading conditions in which node 1 is connected to the high input resistance of N and P-channel devices of the NOR gate 30.

Also in circuit A, a change to a high level, digital signal input *f1*, (e.g. +V*dd*, binary "1") at time *t2* reverses the states of the N and P-channel devices wherein the P-channel device 11 is turned off and the N-channel device 10 is turned on and the output voltage at node 1 is inverted, goes to zero volts (binary "0").

In either case, virtually no DC current flows from the supply +V*dd*, but the output at node 1 is drawn to the supply voltage +V*dd* when the P-channel device 11 is conducting and the N-channel device 12 is nonconducting. At lower threshold A*t*, the output at node 1 changes to the lower level (OV) by the greater conduction of N-channel device to ground and lesser conduction of the P-channel device. The change in level of the signal input *f1*, digital level "0" to "1" (0 to V*dd*), is inverted in circuit A to change the output level from +V*dd* to 0 volts which, at this point in the discussion of the operation, is merely the isolated function of the circuit. Similarly, when considering only the switching function in response to distinct changes in level of the input signal between 0 and +V*dd*, the complementary circuit B operates in a similar manner as the circuit A.

Figure 5:
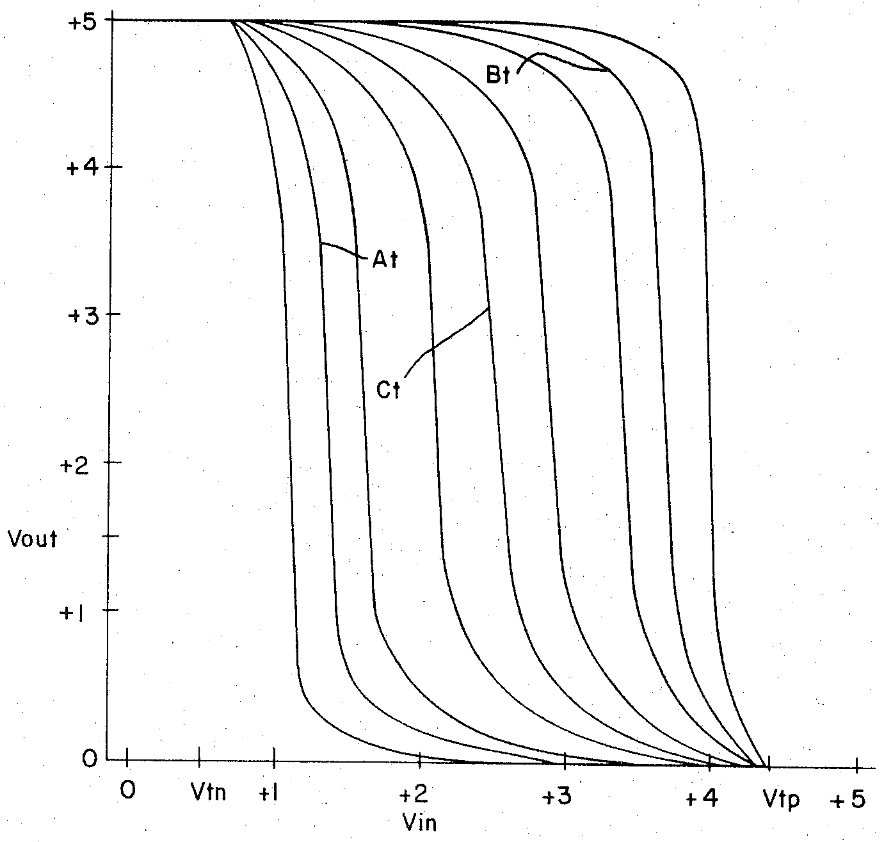
FIG. 5 is a graph for illustrating the transfer characteristics of several CMOS inverters with different impedance ratios showing a balanced characteristic, and typical unbalanced characteristics used for achieving low and high threshold circuits of the invention.

Considering now other important aspects of the preferred embodiment of the invention, the complementary operation of the circuits A and B provided in the preferred embodiment by the impedance ratio ($Zr=5$) of N and P-channel devices 10 and 11 of circuit A, provides a low level digital circuit threshold voltage of 1.5 volts; and the impedance ratio ($Zr = 1/5$) of N and P devices 12 and 13 provides a high level digital circuit threshold voltage of 3.5 volts, as indicated by the transfer characteristics in FIG. 5. As is also evident from the transfer curves of FIG. 5, input signal level discrimination or threshold voltages provided by the complementary circuits A and B can be varied by individually varying the threshold voltages as a consequence of varying the respective impedance ratios of the individual circuits. Accordingly, the individual threshold voltage levels may be adjusted by variation of the respective circuits A and B for moving about the transfer curves $At$ and $Bt$. Accordingly, the separation of the threshold voltages may be increased or the thresholds of the individual circuits A and B may be adjusted as desired for establishing the desired discrimination levels or separation in levels.

Figure 2:
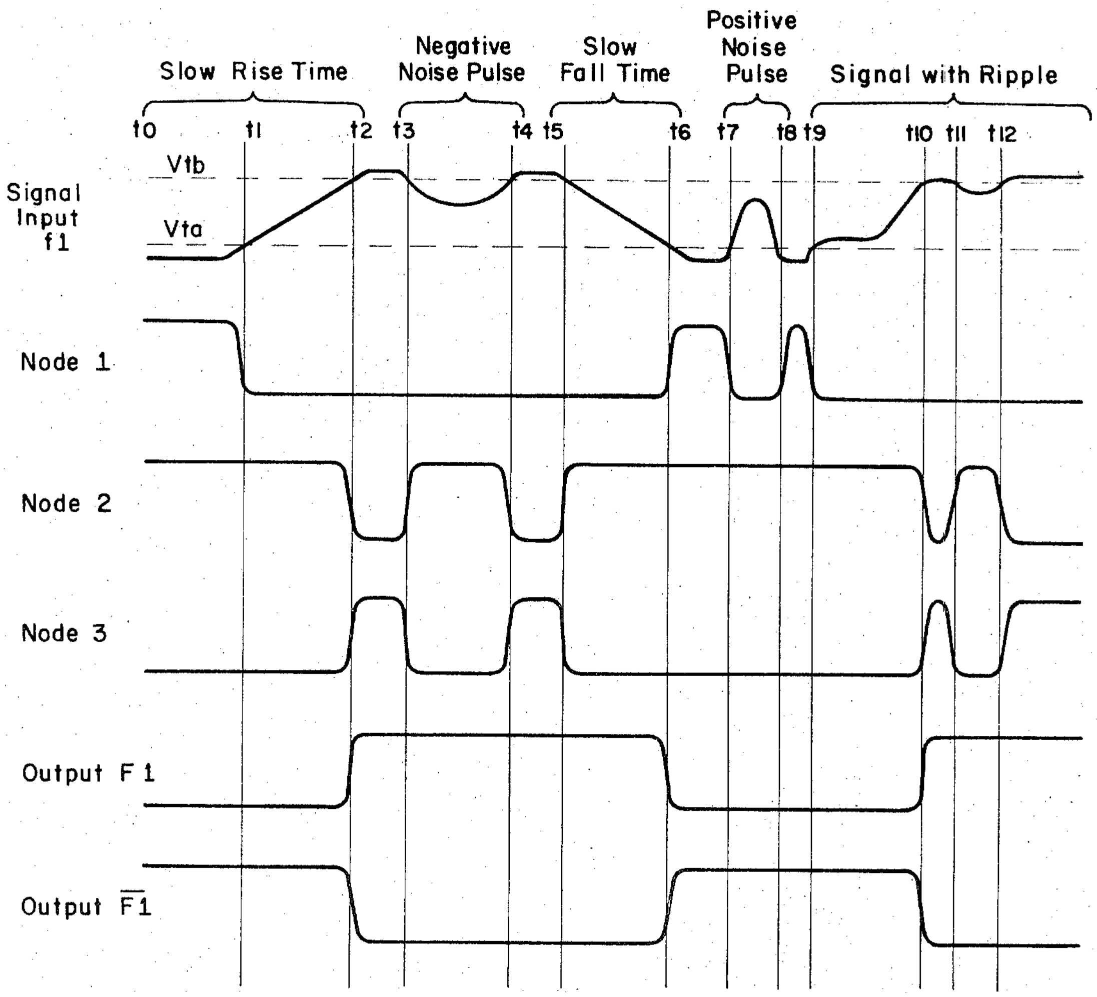
FIG. 2 is a timing diagram illustrating the operation of the circuit of FIG. 1 of the preferred embodiment of the invention for providing low and high threshold voltage levels to insure that input signal noise does not appear in the complementary outputs of the bistable circuit arrangement.

Referring now to FIGS. 1 and 2, a digital signal input waveform, having slow rise and fall times, noise pulses and signal ripple is used to illustrate the operation of the complementary circuits A and B of FIG. 1. The timing diagram of FIG. 2 is illustrative of a signal waveform including a slow rise time from the low to high digital signal levels, e.g., binary "0," "1". During the slow transition between levels, the signal traverses 0 to +5 volts and the separated low and high level threshold voltages $Vta$–$Vtb$ of circuits A and B, in the order indicated, where the lower threshold voltage of circuit A is threshold voltage $Vta$ and the higher threshold voltage $Vtb$ of circuit B. These threshold voltage levels of circuits A and B correspond to transfer curves $At$ and $Bt$ respectively of FIG. 5.

The outputs of complementary circuits A and B are indicated at node 1 and node 2 in FIG. 1 and the timing diagram of FIG. 2. As the signal input $f1$ crosses the lower threshold voltage $Vta$ of circuit A, the output at node 1 changes from high to low binary level while the state of circuit B remains unchanged until time $t2$ when the input signal crosses over the threshold voltage level of $Vtb$ of circuit B. Only at time $t2$, therefore, does the output of circuit B, as provided at node 2 and indicated in FIGS. 1 and 2, change from the high to low level. During the period of transition $t1$–$t2$ of the signal input $f1$ from the lower threshold level to the upper threshold level, the outputs of circuits A and B are at different binary levels, node 1 being at the lower logical level and node 2 being at the higher binary level i.e. 0/1. Subsequent to the crossover of the upper threshold level $Vtb$ by signal input $f1$ at time $t2$, and as long as the signal level remains above the upper threshold level, both outputs of circuits A and B will remain at the lower binary level, e.g., the time period $t2$–$t3$. Accordingly, during time periods in which the outputs at nodes 1 and 2 are at the same logical level, a stable condition is indicated, while time periods in which nodes 1 and 2 are at opposite logical levels a state of transition is indicated whether it be due to a slow transition from one logical level to another or a noise condition including noise pulses or signal ripple.

In view of the foregoing discussion of the transition of the signal at input $f1$ (FIG. 1) from one logical level to the other during a slow rise time $t1$–$t2$, the remainder of the operation of the circuit becomes more readily apparent. The negative noise pulse indicated in the time interval $t3$–$t4$ (FIG. 2), the signal input $f1$ traverses the higher threshold level $Vtb$ to produce a change in state of circuit B, and its output from low to high logical level at node 2. The output of circuit B remains at the high logical level until the end of the negative noise pulse, at which time $t4$ the input signal crosses back over the upper threshold level $Vtb$ causing the output at node 2 to return to the low logical level. The output of circuit B remains at the low level for a short interval $t4$–$t5$ and at time $t5$ the slow transition of the input signal to the low logical level is indicated. At time $t5$, the slow transition of the signal input $f1$ to the low logical level crosses the higher threshold level $Vtb$ to again change the state of circuit B to produce the high logical level at the output at node 2. During this slow transition from high to low levels at the signal input $f1$, the output of circuit A remains at the lower logical level and only at time $t6$, when the signal input $f1$ crosses the lower threshold level $Vta$, circuit A responds, changing state to produce an output at the high logical level at node 1.

It should be noted, therefore, that during the time interval $t1$–$t6$, the output of circuit A at node 1 remains at the low logical level and is not responsive to upper level threshold crossovers due to noise in the input signal. Circuit A, therefore, is not responsive to noise in the input signal during the time period the input signal is essentially at the high logical level. The resulting complementary combination of A and B provides inputs for noise immunity in the bistable circuitry.

During the time interval $t6$–$t8$, circuit A is responsive to the positive noise pulse at the signal input $f1$, occurring during the interval $t7$–$t8$. Since the noise pulse occurs while the input signal is at the low logical level, and the noise pulse does not exceed the wide separation in the threshold levels $Vta$–$Vtb$ of circuits A and B, only circuit A changes state as the positive noise pulse crosses only the lower threshold level $Vta$. In response to the crossing of the threshold $Vta$ at $t7$, the output of circuit A at node 1 changes from the high to low logical level during the time interval of the noise pulse $t7$–$t8$. At time $t8$ as the input signal again crosses the low threshold voltage to the low logical level, the output of circuit A at node 1 again reverts to the high logical level and remains high until the following transition of the input signal to the high logical level.

The transition occurring during the time interval of $t9$–$t10$ includes noise in the input signal in the form of a ripple as shown in FIG. 2. The ripple continues during the longer time interval $t10$–$t12$ while the input signal is essentially at the high logical level. The combination of slow rise time and ripple in the signal input $f1$ in the time interval $t9$–$t10$, the output of circuits A and B are at opposite low and high logical levels respectively, as shown by the waveforms for nodes 1 and 2. At time $t10$, a stable state of circuit F is established when the high threshold level $Vtb$ is crossed by the input signal and the output of circuit B at node 2 changes to the low logical level which is the same level as node 1. Subsequent crossovers produced by the ripple in the input signal during the time interval $t11$–$t12$ only change the output at node 2 from the low to high logical level. The output of circuit B at node 2 returns to the low logical level at time $t12$ to remain in this state until further noise or input signal transition produces crossover of the high threshold level $Vtb$.

It is evident from the foregoing that complementary circuits A and B provide outputs which, when utilized in combination, are capable of providing high noise immunity by the relatively wide separation of threshold levels of respective circuits, i.e., the input signal is required to traverse substantially the range between energizing potentials of the source to produce sequential switching of the circuits.

Figure 3:
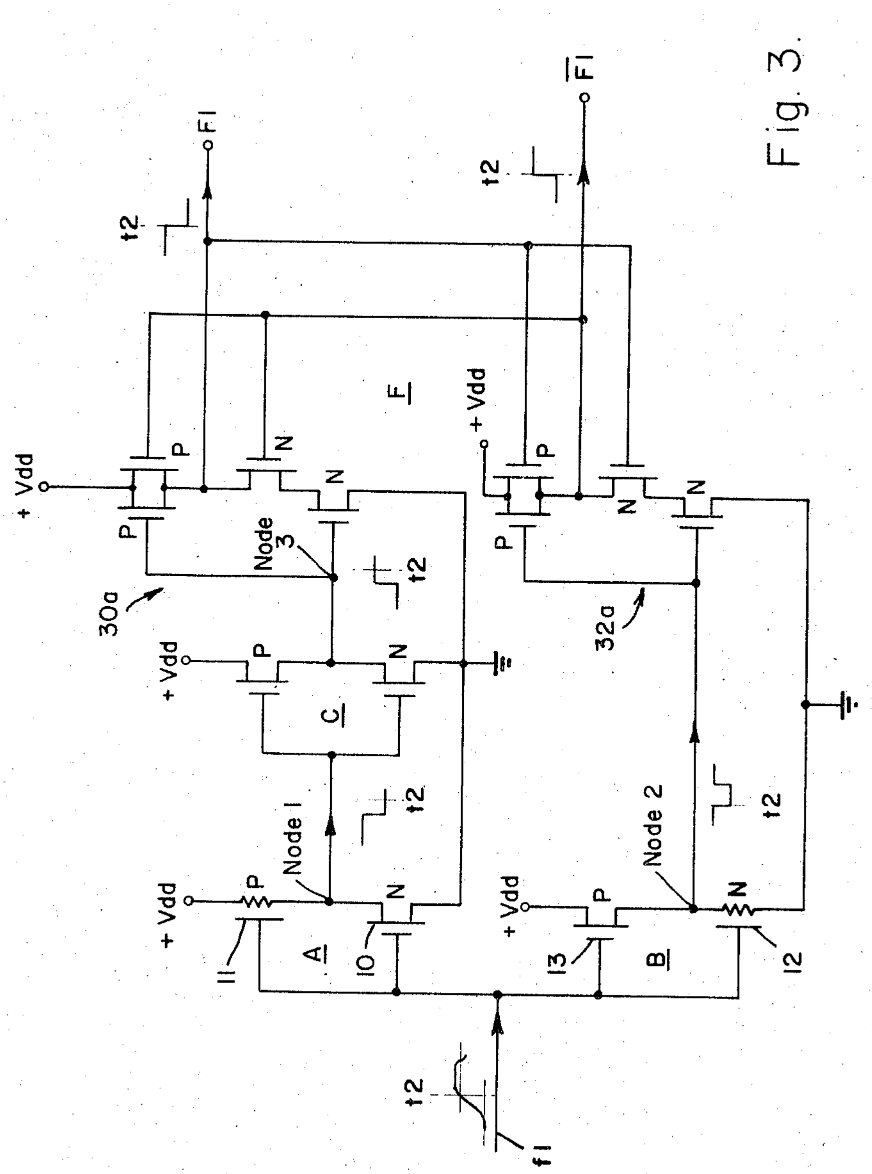
FIG. 3 is a schematic circuit diagram of an alternate preferred embodiment of the bistable circuit arrangement of the invention.

Utilization of these outputs in combination is provided by a bistable state circuit having inputs for the complementary outputs of the circuits A and B. The bistable circuit F, illustrated in FIG. 1, includes cross-coupled NOR gates 30 and 32 having inputs coupled to nodes 1 and 3. The input at node 3 is the complement of the input provided at node 1, wherein the output of circuit B at node 2 is coupled to a balanced inverter C for inversion of the signal output at node 2 of circuit B. Complementary inputs to the bistable circuit F can also be provided by inversion of the output of circuit A at node 1 as shown in FIG. 3. However, in the preferred embodiment of FIG. 1, the balanced inverter C is located in the output of circuit B to provide an inverted output to the NOR gate 32 of the bistable circuit F. The transfer characteristic for circuit C is shown in FIG. 5 by transfer curve Ct, and the inverted output of circuit C is shown in FIG. 2 by the signal output waveform for node 3. Complementary circuits (CMOS) providing the operation of balanced circuit C have the transfer curve Ct (FIG. 5).

In the preferred embodiment of FIG. 1, the bistable circuit F comprises an R/S flip-flop formed from cross-coupled NOR gates 30 and 32 which are responsive to the complementary outputs of circuits A and C at nodes 1 and 3 respectively, to produce outputs F1 and $\overline{F1}$. The bistable circuit F remains in a stable condition until sequential traverse of circuit thresholds $V_{ta}$, $V_{tb}$ of both circuits A and B occurs. Because of the wide separation of the voltage thresholds $V_{tb}$ and $V_{ta}$, as illustrated, the input signal must traverse most of the range between potentials of the supply (0 to +5v) before circuit F will recognize a change of logical level applied to input. As shown in FIG. 1, the NOR gates 30 and 32 forming the bistable circuit F each include an inverter with two N-channel devices in parallel and connected in series with two P-channel devices in series, between positive and ground potentials of the supply source. Each of two inputs including node 1 and the output of the other gate 32 of the pair is connected to the respective gates of one N-channel device and one P-channel device.

In operation, the circuit response to an input signal $f1$, changing from a low logical level to a high logical level and having a slow rise time as shown in the timing diagram of FIG. 2 will change the state of the bistable circuit F at time $t2$ after traversing both circuit threshold voltages $V_{ta}$ and $V_{tb}$. Further, the bistable circuit F will remain in the resulting stable state until both circuit threshold voltages $V_{tb}$ and $V_{ta}$ are again traversed and will not respond to input signal level excursions repeatedly traversing a single threshold voltage $V_{tb}$ at times $t3$ and $t4$, for example.

Initially, signal input $f1$, as shown in FIG. 2, is at the low logical level, below the threshold $V_{ta}$ of circuit A, at time $t1$ the signal input crosses the threshold voltage $V_{ta}$ at the beginning of the change in logical level of the input signal, and at time $t1$ the output of circuit A at node 1 changes from the previous high to the low logical level. However, because of the slow rise time the signal level does not cross the threshold level $V_{tb}$ until a later time $t2$, at which time the output (node 2) of circuit B changes from the high to low logical level. The output of circuit B at node 2 is inverted by circuit C to produce a change from the low to high logical level at the output at node 3. The complementary low and high levels at nodes 1 and 3 applied to the inputs of gates 30 and 32 respectively, produce a change in state of the bistable circuit F. As a result, the output F1 changes from the low to high level at time $t2$ and the output $\overline{F1}$ changes from the high to low level.

In the exemplary operation, it is important to note that the state of circuit F remains unchanged until the input reaches the threshold level $V_{tb}$ of circuit B, somewhat greater than the P-channel threshold from the positive supply voltage, and the output is now stable until the signal input $f1$ reverses to again cross the level somewhat greater than the N-channel threshold from ground potential. This stability is demonstrated in the time period $t3$–$t4$ in which the signal excursion crosses threshold $V_{tb}$ but does not cross the lower threshold voltage $V_{ta}$. As shown in FIG. 2, complementary circuit B is shown to be responsive to a crossing of the threshold $V_{tb}$, at times $t3$ and $t4$, as shown by the waveform for node 2 in which the output changes from the low to high logical level and returns to the low level in response to the crossing of the thresholds at times $t3$ and $t4$. The signal level at node 2 is inverted by circuit C to provide the change in level indicated by the waveform for node 3 which is supplied to an input for gate 32, i.e., the gates of one of the series connected P-channel devices (PMOS) and one of the parallel connected N-channel devices (NMOS) as shown. The high to low level transition of the signal at node 3 at time $t3$ is not effective to change the state of circuit F because of the other P-channel device in series, which is held in a non-conducting state by the high level feedback from the output F1. This high level crosscoupling from output F1 is also applied to the other one of the N-channel devices in parallel, maintaining it in a conducting state and thereby maintaining the output $\overline{F1}$ at the low level. Accordingly, the return of the signal input F1 to the high logical level at time $t4$, recrossing the threshold level $V_{tb}$, returns the signal level at node 3 to the previous high level without any change in state of the bistable circuit F during the time period $t3$–$t4$.

Conversely, when the bistable circuit F is in the false state, in which output F1 is at the low level and output $\overline{F1}$ is at the high level, a signal input successively crossing over the lower threshold voltage $V_{ta}$, for example, at times $t7$ and $t8$, will not be responsive to the lower threshold crossings. Further, circuit F will not recognize a change of state until the other threshold voltage is crossed by the signal input. This characteristic of the invention as shown by the preferred embodiment of FIG. 1 is often referred to as "hysteresis" for the reason that, once it is set in a given state, the signal input must change to substantially the other level before a change of state is recognized. Accordingly, the output is a function not only of the input level but also the previous level, and an intermediate signal input level produces the same output as the immediately prior logical signal input level.

This characteristic provides additional advantages in shaping of signal inputs having slow rise and fall times as illustrated by outputs F1 and $\overline{F1}$ in response to slow rise and fall times $t1$–$t2$ and $t5$–$t6$. The other additional advantages are found in rejection of ripple in the input signal, e.g., during the time interval $t9$–$t12$ or the combination of slow rise time and ripple during the time interval $t0$–$t10$. The following TABLE I illustrates the logical levels of the outputs in response to the signal input $f1$ as shown in FIG. 2.

TABLE I

| COMPLEMENTARY OUTPUTS | | | | BISTABLE OUTPUTS | | |
|---|---|---|---|---|---|---|
| | Node 1 | Node 2 | Node 3 | F1 | $\overline{F1}$ | |
| $t0$ | 1 | 1 | 0 | 0 | 1 | $t0$–2 |
| $t1$–2 | 0 | 1 | 0 | 0 | 1 | |
| $t2$–3 | 0 | 0 | 1 | 1 | 0 | |
| $t3$–4 | 0 | 1 | 0 | 1 | 0 | |
| $t4$–5 | 0 | 0 | 1 | 1 | 0 | $t2$–6 |
| $t5$–6 | 0 | 1 | 0 | 1 | 0 | |
| $t6$–7 | 1 | 1 | 0 | 0 | 1 | |
| $t7$–8 | 0 | 1 | 0 | 0 | 1 | |
| $t8$–9 | 1 | 1 | 0 | 0 | 1 | |
| $t9$–10 | 0 | 1 | 0 | 0 | 1 | $t6$–10 |
| $t10$–11 | 0 | 0 | 1 | 1 | 0 | |
| $t11$–12 | 0 | 1 | 0 | 1 | 0 | $t10$–12 |
| $t12$ | 0 | 0 | 1 | 1 | 0 | |

The foregoing operational features of the bistable circuit of the present invention provide for high noise immunity at the outputs including positive and negative noise pulses along with the signal ripple. These features make the circuit useful on the integrated circuit chip or in the input circuitry to the chip in allowing for flow rise or slow fall times in signals including those resulting from intentional time delays which can be used without concern for "signal race" or indeterminate signal levels. Also, these uses reduce the total amount of external circuitry for noise immunity. Another application of this invention is in ripple counter, where a slow state decoder, slower than the ripple time interval can still produce sharp, well defined edges.

Referring now to FIG. 3 for a detailed description of the alternate preferred embodiment, complementary inputs to the bistable circuit F are provided by inversion of the output of threshold circuit A by inverter circuit C and coupling to node 3 and the input of bistable circuit F as shown in FIG. 3, and coupling the output of threshold circuit B directly to its bistable circuit input. In order to accommodate the reversal of logical level of the threshold circuit outputs, NAND gates 30*a*, 32*a* are substituted for NOR gates 30, 32 of the preferred embodiment of FIG. 1. NAND gates 30*a*, 32*a* consist in corresponding input gates in which parallel P-channel devices are connected to the positive potential (+V*dd*) and N-channel devices connected in series to ground potential of the supply source.

The coupling of complementary inputs from node 3 and node 2 are to one of the parallel P-Channel devices and one of the series N-Channel devices of the respective NAND gates 30*a*, 32*a*. Cross coupling of NAND gates is provided by output connections F1 and $\overline{F1}$ from the node between P and N-channel devices to the other NAND gate P and N-channel devices as shown in FIG. 3. The inversion of complementary input signal polarity to the bistable circuit now provides for bistable operation and the features and advantages of the bistable circuit as discussed relative to the preferred embodiment of FIG. 1.

Figure 7:
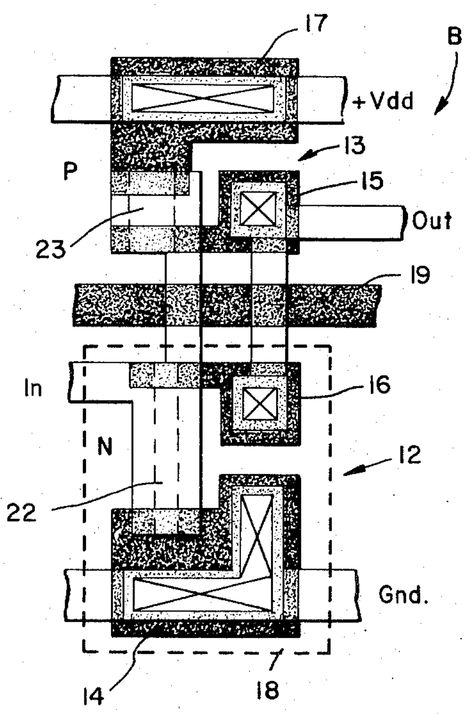
FIG. 7 is a diagrammatic illustration similar to FIG. 1 showing mask geometry for a typical high threshold CMOS inverter. An unbalanced characteristic is attained by proper ratio of impedances of the conductive channels.
Figure 6:
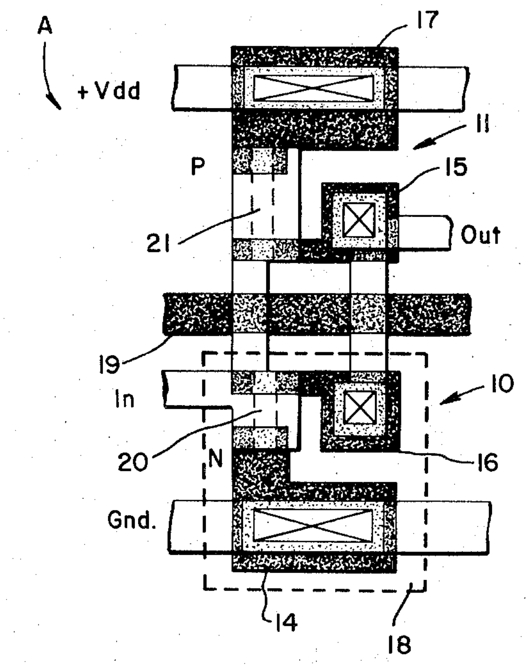
FIG. 6 is a diagrammatic illustration of a portion of a composite showing mask geometry for a typical low threshold CMOS inverter circuit, one of the complementary pair of threshold circuits of the invention. The ratio of impedances, each of which is determined by width/length (W/L) of the conductive channel, is illustrated for an unbalanced transfer characteristic producing low threshold voltage.

Referring now to FIGS. 6 & 7, the configuration of mask geometry for complementary threshold circuits A and B is shown for producing unbalanced transfer characteristics for low and high level circuit threshold voltages, respectively. In general, the processing of the low threshold circuits shown in FIGS. 6 and 7 follow conventional CMOS integrated circuit processing techniques in which a sequence of diffusion and photolithographic engraving steps are applied to a silicon wafer substrate. The complementary threshold circuits comprise a very small area of a chip containing other circuitry.

In the preferred embodiment, the substrate of the threshold circuits consists of a uniform single crystal of N-type silicon which undergoes processing steps introducing impurities to the desired depths and concentrations by controlling deposition, temperature and time. Control of lateral extent of various geometries is provided by photo masking and etching techniques. Silicon dioxide provides a layer of insulating material on a surface of the substrate which is selectively opened for sequential diffusion steps, and the oxide is replaced, except for the metal-contact area. The metal control electrodes or gates 20, 21, 22, 23 of the MOS devices 10, 11, 12 and 13 are separated from the semiconductor material, silicon, by a thin layer of silicon dioxide as distinguished from the thicker insulating layer in areas that are not gates.

The complementary threshold circuits A and B as illustrated in FIGS. 6 and 7 respectively, each include a P-channel and an N-channel pair wherein the P-type material is diffused vertically into the N-type substrate to form a P-type well (indicated by dashed line 18) in the regions where N-channel devices are located. The source and drain regions 15, 17 of the P-channel devices and the well ring 19 are formed by diffusion of P-type material into the N-type substrate. Source and drain regions 14, 16 of N-channel devices are formed by diffusion of N-type material into the P-well regions.

The formation of the channel regions 20, 21, 22, 23 and more particularly the width and length of the channels of the individual devices 10–13 is important in establishing the desired unbalanced characteristics for the threshold circuits A and B to provide the desired separation of low and high threshold voltage levels of the respective circuits A and B. Referring particularly to FIG. 6, the desired low level threshold of the circuit A, including both N and P-channel devices 10, 11 is determined by the ratio of impedances of the individual N and P-channel devices. As indicated supra, if $\alpha$=2 the impedance ratio is equal to 2R*n*/R*p* where R*n* equals the width/length ratio of the channel region of the N-channel device 10 and R*p* equals the width/length ratio of the P-channel device 11.

In general, the pair of MOS devices in an individual circuit should be of minimum area, consistent with other circuit requirements. In view of processing limitations, including consideration of the area occupied by the circuits on the chip, the P-channel device 13 of FIG. 2 has a channel region 23 of minimum length, 0.2 mils, and the width is 0.4 mil (widest channel) to provide a near minimum of area for the channel. The length of the channel 23 is actually 0.2 mil, as shown by the preferred embodiment, allowing for 0.1 mil decrease from the 0.3 mil spacing of source and drain regions bordering the channel, i.e., lateral diffusion of the P-type materials projects 0.05 mil below the surface.

Having established the impedance for the P-channel device 13 of the high threshold circuit of FIG. 2, an equal impedance is now provided for the N-channel device 10 of the low threshold circuit of FIG. 6. Since the N-channel device 10 has twice the mobility of the P-channel device 13, the width of the channel of the N-channel device is one-half the width of the P-channel device 13 with the minimum length established by the tolerances required for diffusion in the process of fabrication.

The impedance of the P-channel device relative to the impedance of the N-channel device of the complementary circuit A illustrated diagrammatically in FIG. 6, establishes the impedance ratio ($Zr = 2\ Rn/Rp$). Assuming a circuit threshold voltage of a + 1.5 volts is desired, the unbalance provided by an impedance ratio ($Zr = 5$) provides the transfer curve as shown in FIG. 5. The impedance ratio ($Zr = 5$) is provided by $Rn$ of the N-channel device which has been selected to have a value of 1 ($Wn/Ln = 0.2$ mils) and an $Rp$ ($Wp/Lp = 0.2$ mils/0.5 mils). The desired impedance ratio of the circuit A is then established, as follows:

$Rn/Rp = (0.2/0.2)/(0.2/0.5) = 2.5$ $Zr = 2Rn/Rp = 2(2.5) = 5.$

The high threshold voltage of the circuit of FIG. 7 is obtained by unbalanced transfer characteristic $Bt$ shown in FIG. 5. This transfer curve $Bt$ provides a high threshold voltage of approximately 3.5 volts by an impedance ratio ($Zr = 1/5$). The geometric arrangements of the MOSFETS are determined in the same manner as described in connection with the circuit A of FIG. 6. As shown in FIG. 7, $Wn/Ln = 0.2$ mils/1.0 mil and $Wp/Lp = 0.4$ mil/0.2 mil or a ratio $Rn/Rp = 1/10$th and an impedance ratio ($Zr = 2\ Rn/Rp = 1/5$).

In both FIGS. 6 and 7, the channel regions 20–23 of the respective devices 10–13 are indicated by the areas between the parallel dashed lines connecting the source and drain regions. The metal control electrode or gate, covers the channel regions and extends laterally to adjacent areas as shown, leading to "IN" designation which is the input line. The field effect is produced in a channel by a voltage placed on the gate which induces an inversion in the channel region of the semiconductor substrate located beneath the gate. The degree of inversion controls the conduction between respective opposing source and drain regions. The conduction of the channels is determined by respective W/L ratios, and the impedance ratio of the individual MOSFETS of each inverter determines their respective unbalances and the desired threshold voltages as indicated by the transfer curves in FIG. 5.

Figure 4:
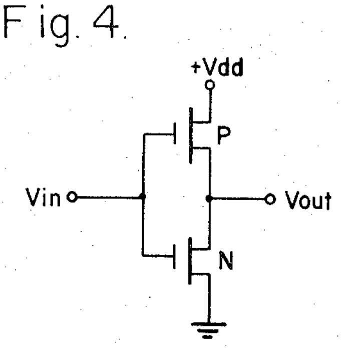
FIG. 4 is a schematic diagram of a typical CMOS inverter circuit in which the transfer characteristic may be unbalanced or shifted by varying impedance ratios to provide the low or high threshold circuits of the invention.

FIG. 4 is a schematic diagram of a typical CMOS inverter having P and N-channel devices connected in series between high and low potentials of the energizing source with the gates connected in parallel to the signal input Vin and the drain electrodes connected in parallel to the signal output Vout. The transfer curves shown in FIG. 5 have been plotted with varying impedance ratios ($Zr$) of the circuit of FIG. 4 including impedance ratios and transfer curves $At$, $Bt$, $Ct$ for circuits A, B and C respectively shown in FIG. 1. In FIG. 5, the input signal voltages (0 to +5) are indicated on the horizontal axis to provide the signal output voltages (0 to +5) as shown on the vertical axis. The transfer curve for a balanced inverter circuit C is indicated in FIG. 5 by the curve Ct which is located substantially midway between the high and low levels of the input. In general, the impedance ratio of the balanced inverter is equal to unity and the ratio of unbalanced inverter A greater than one and inverter B is less than one. In the preferred embodiment, the impedance ratios of circuits A and B provide the unbalance in characteristics indicated by the transfer curves $At$ and $Bt$ and corresponding circuit threshold voltages of 1.5 volts and 3.5 volts. Accordingly, when the ratio of impedances of the CMOS circuit as shown in FIG. 4, is equal to one; a balanced characteristic is obtained while unbalanced characteristics are produced when the width/length ratio of the devices of a pair are selected in the process of mask design to provide the desired impedance ratios of less than one or greater than one.

In view of the foregoing, it is now readily apparent that by adjusting the ratio of impedances of the P and N-channel devices of the inverter circuit shown in FIG. 4, that circuits A and B can be provided having threshold voltages which correspond to the respective ratios of impedances providing the unbalanced characteristics of the transfer curves shown in FIG. 5. The transfer curves of FIG. 5 are typical and by selective adjustment of impedance ratios the balance or the unbalance can be adjusted to provide threshold voltages in the range of approximately 1 and 4 volts for energizing source of +5 volts. The typical transfer curves were derived from a CMOS inverter circuit in which the processing configuration provided device threshold voltage of 0.5 volt, i.e., $Vtn = Vtp = 0.5$ volt and the gain coefficient or transconductance ratio of the individual MOS devices is two, as follows:

$K'on = 2K'op$ where $K'on$ is the current coefficient of the N-channel device and a $K'op$ is the current coefficient of the P-channel device.

Complementary circuit threshold voltages according to the preferred embodiment are located on corresponding sides of the balanced transfer characteristic $Ct$ to provide the low threshold voltage below the threshold voltage of the balanced inverter, and the high threshold voltage above the threshold voltage of the balanced inverter. However, complementary low and high circuit threshold voltages can be located to establish the desired threshold separation for desired operation. Further, individual circuits can be provided with threshold voltages at a desired level according to the unbalanced characteristic which is determined by the impedance ratio provided for that individual circuit during mask design.

While a preferred embodiment of the invention has been disclosed, it should be clear that the present invention is not limited thereto as many variations will be readily apparent to those skilled in the art.

I claim:

1. Logical storage means comprising:

complementary threshold circuit means including a pair of complementary MOS inverter circuits having inputs for receiving digital signals, and outputs; said threshold circuit means having unbalanced transfer characteristics providing separated high and low threshold levels near high and low supply potentials, respectively, bistable circuit means having a plurality of inputs coupled to said threshold circuit outputs for receiving complementary high and low logical level input signals to provide a stable state condition, said bistable state circuit means including outputs for providing high and low level logical signals indicating the stable state of the bistable circuit means, and said bistable circuit means comprises NOR gates having cross-coupled outputs.

2. The logical storage means of claim 1 which further includes an inverter circuit coupling the threshold circuit means to said bistable circuit means to provide complementary high and low level logical stable state signals to the inputs of the bistable circuit means.

3. The logical storage means according to claim 1 in which said complementary MOS circuits include relatively high and low impedance P-channel and N-channel devices respectively to provide an unbalanced transfer characteristic and a low threshold voltage near the low supply potential and relatively low and high impedance P-channel and N-channel devices respectively to provide a high threshold voltage near the high supply potential.

4. The logical storage means according to claim 1, wherein a signal input circuit means for supplying said complementary input signals is connected to said plurality of inputs, said signal input means comprising a complementary pair of threshold circuits having separated high and low threshold levels responding to changes in the logical level of an input signal traversing said threshold levels, said bistable circuit means including circuit means for maintaining one of the stable states and responsive to a combination of changes in logical levels of the complementary input signals to produce a change in state of said bistable circuit means.

5. Logical storage means comprising:

complementary threshold circuit means including a pair of complementary MOS inverter circuits having inputs for receiving digital signals, and outputs; said threshold circuit means having unbalanced transfer characteristics providing separated high and low threshold levels near high and low supply potentials, respectively;

bistable circuit means having inputs coupled to said threshold circuit outputs for receiving complementary high and low logical level signals to provide a stable state condition, said bistable state circuit means including outputs for providing high and low level logical signals indicating the stable state of the bistable circuit means; and said bistable circuit means comprises NAND gates having cross-coupled outputs.

6. The logical storage means according to claim 5, wherein a signal input circuit means for supplying said complementary input signals is connected to said plurality of inputs, said signal input means comprising a complementary pair of threshold circuits having separated high and low threshold levels responding to changes in the logical level of an input signal traversing said threshold levels, said bistable circuit means including circuit means for maintaining one of the stable states and responsive to a combination of changes in logical levels of the complementary input signals to produce a change in state of said bistable circuit means.

* * * * *